Figure 3:
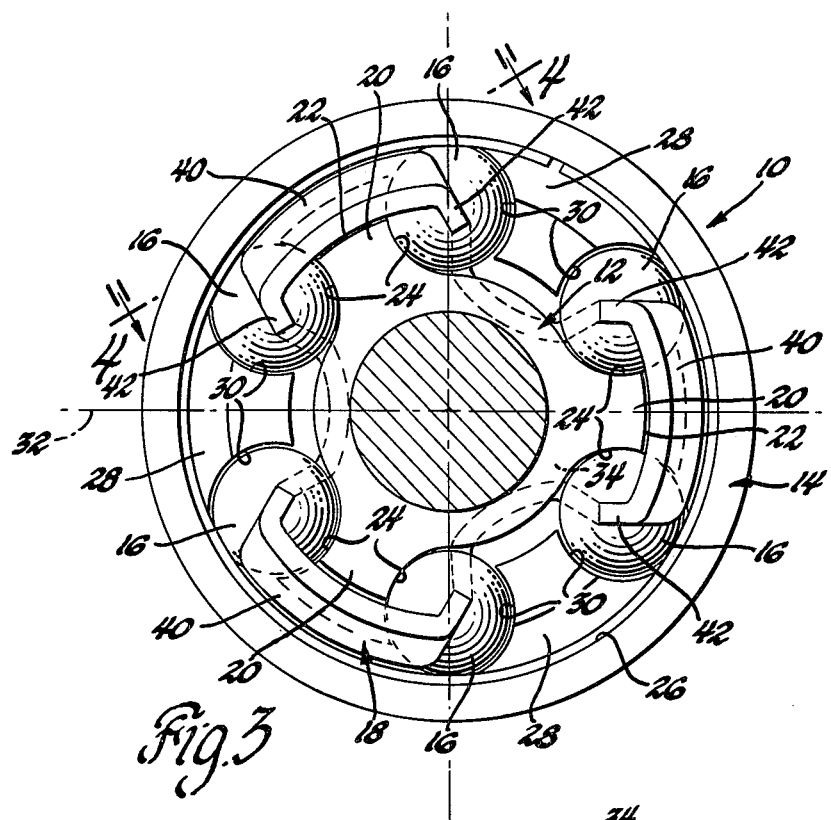

United States Patent [19]

Kimberlin

[11] 4,149,392
[45] Apr. 17, 1979

[54] CONSTANT VELOCITY UNIVERSAL JOINT

[75] Inventor: Dan R. Kimberlin, Frankenmuth, Mich.

[73] Assignee: General Motors Corporation, Detroit, Mich.

[21] Appl. No.: 781,714

[22] Filed: Mar. 28, 1977

[51] Int. Cl.² .............................................. F16D 3/34
[52] U.S. Cl. ...................................................... 64/21
[58] Field of Search ................... 64/21, 9 A, 7, 8, 9 R

[56] References Cited

U.S. PATENT DOCUMENTS

| | | | |
|---|---|---|---|
| 1,721,060 | 7/1929 | Swartz | 64/9 A |
| 1,763,332 | 6/1930 | Sykes | 64/9 A |
| 3,218,827 | 11/1965 | Aucktor | 64/8 |
| 3,362,190 | 1/1968 | Bretschneider et al. | 64/21 X |
| 3,381,497 | 5/1968 | Allen | 64/7 |
| 3,452,558 | 7/1969 | Cull et al. | 64/21 |

Primary Examiner—Horace M. Culver
Attorney, Agent, or Firm—F. J. Fodale

[57] ABSTRACT

A constant velocity universal joint has tangentially arranged axial groove pairs which receive drive balls which are maintained coplanar by a cage.

6 Claims, 5 Drawing Figures

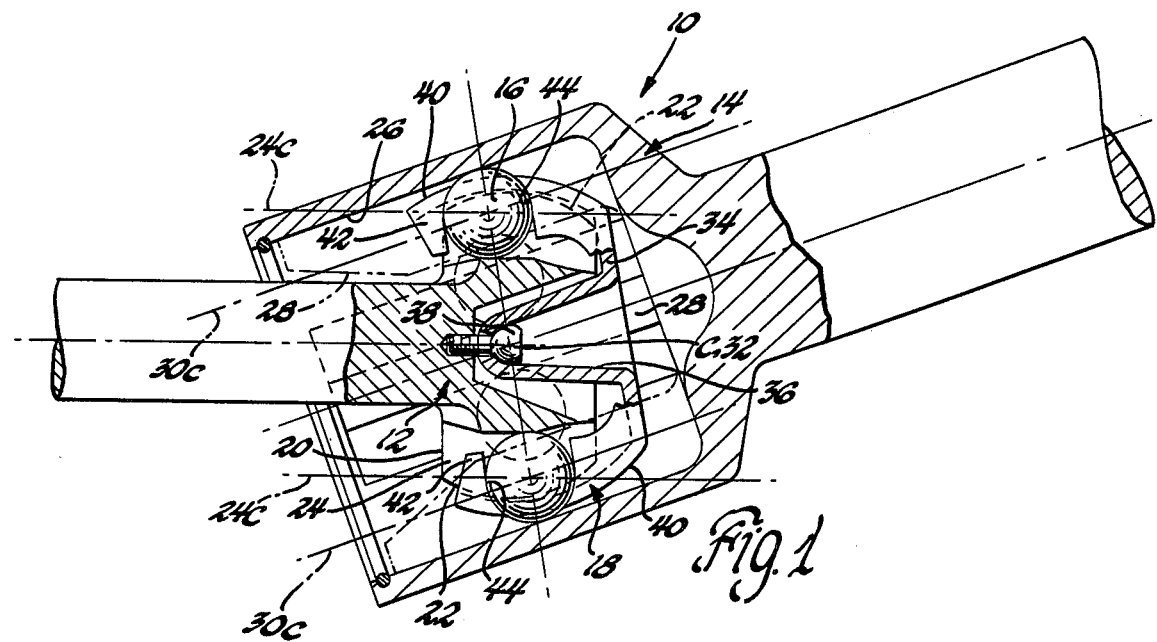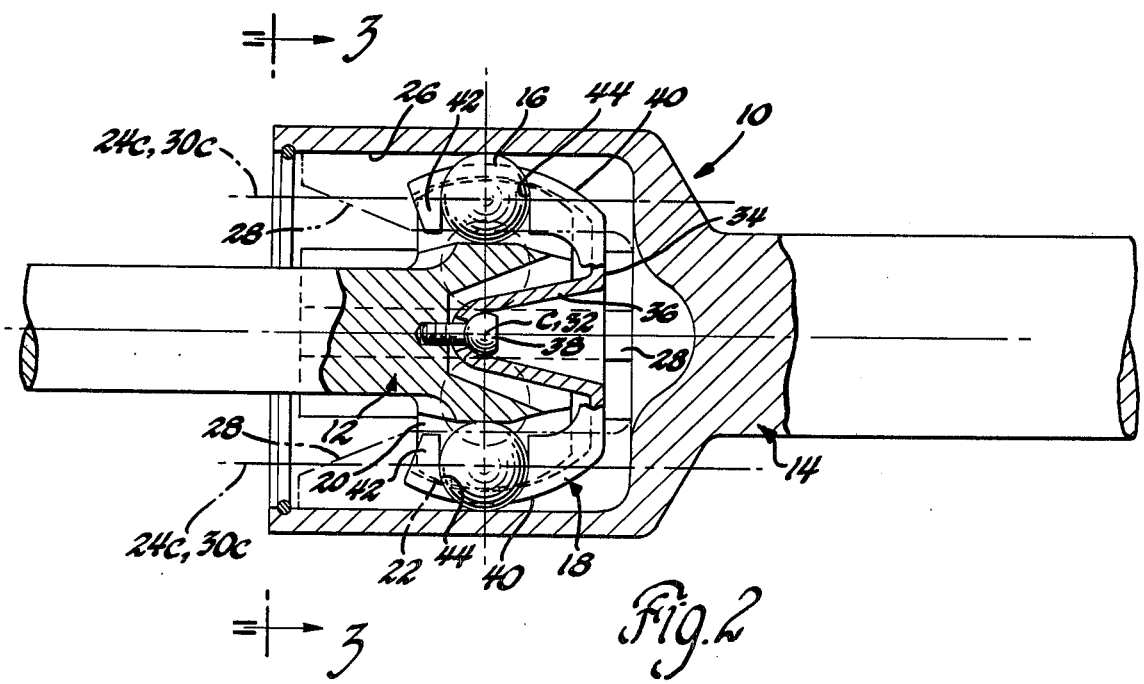

CONSTANT VELOCITY UNIVERSAL JOINT

This invention relates to constant velocity universal joints and more particularly to constant velocity universal joints having a plurality of drive balls disposed in confronting pairs of grooves of respective inner and outer drive members.

It is already known from the U.S. Pat. No. 1,763,332 granted to William E. Sykes on June 10, 1930 to provide a universal shaft coupling in which the inner and the outer drive members have axial grooves arranged in pairs which confront each other in the circumferential direction so as to transfer forces to the drive balls in a direction tangent the pitch circle of the drive balls. With the tangential groove arrangement, only half of the drive balls transfer torque in each direction but this is offset by the fact that higher torque loads can be carried by the individual drive balls.

The universal shaft coupling shown in the Sykes patent does however have one serious drawback in that there is no mechanism to maintain the drive balls in a common plane. Consequently the Sykes coupling at best is only capable of accommodating slight shaft misalignments. Operation at even slight angles is doubtful since a drive ball passing the hinge axis during rotation of the coupling while bent at an angle could move or be forced out of a coplanar relationship with the other drive balls resulting in the coupling binding up and destroying itself.

A later U.S. Pat. No. 3,362,190 granted to Erich Bretschneider and Hermann Leitner on Jan. 9, 1968 discloses a flexible coupling in FIGS. 1-3 which purportedly operates in synchronization (that is, at constant velocity) "because the balls are always adjusted forcibly to half the angle of inclination" (that is, into the homokinetic plane).

The Bretschneider flexible coupling, however, suffers the same defect as the aforementioned Sykes coupling in that there is no mechanism to maintain the drive balls in the same plane and consequently the joint could bind up and destroy itself. Although the Bretschneider patent discloses fitting rings 6 to hold the drive balls in a coplanar position during assembly and disassembly, it is not believed that the rings shown in FIG. 2 are a physical reality in view of FIG. 1 and obviously could not be present even at the smallest joint angles.

The Bretschneider et al patent also explains in connection with FIG. 3 that the drive balls are forcibly adjusted to the half angle. While this may be true of the upper and lower drive balls located in the plane of the joint angle where these two balls are in a groove entrapped condition, it is not true of the middle drive ball located on the hinge axis of the joint which is not groove entrapped. It is precisely because the drive balls must travel through the hinge axis that a mechanism such as a cage is required to maintain the drive balls coplanar.

It is also known from the U.S. Pat. No. 3,218,827 granted to Erich Aucktor on Nov. 23, 1965 to provide a universal joint having drive balls disposed in axial drive grooves of inner and outer drive members and a cage for maintaining the drive balls coplanar. The Aucktor drive grooves, however, are arranged in pairs which confront each other in the radial direction. The Aucktor drive grooves being in radially confronting pairs do not entrap the drive balls positioned in the plane of the joint angle while providing a maximum entrapment of the drive balls positioned on the hinge axis perpendicular to the joint where the drive balls do not have any effect on locating the attitude of the cage. Consequently the Aucktor cage must be located in the homokinetic plane by the drive balls positioned between the plane of the joint angle and the hinge axis. By contrast Applicant's invention provides a maximum entrapment of a drive ball located in the plane of the joint angle which being located at a maximum distance from the hinge axis very effectively locates the cage and consequently all of the drive balls in the homokinetic plane.

In its broadest terms, the object of my invention is to provide a constant velocity universal joint having tangentially arranged axial groove pairs receiving drive balls which are maintained coplanar by a cage.

Another object of my invention is to provide such a universal joint having a simple unitary cage which engages the drive balls across their major diameter to maintain the ball centers coplanar.

Figure 4:
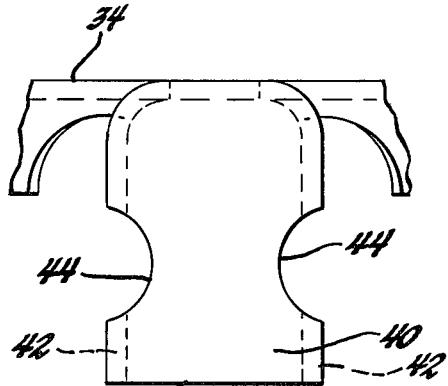
Figure 5:
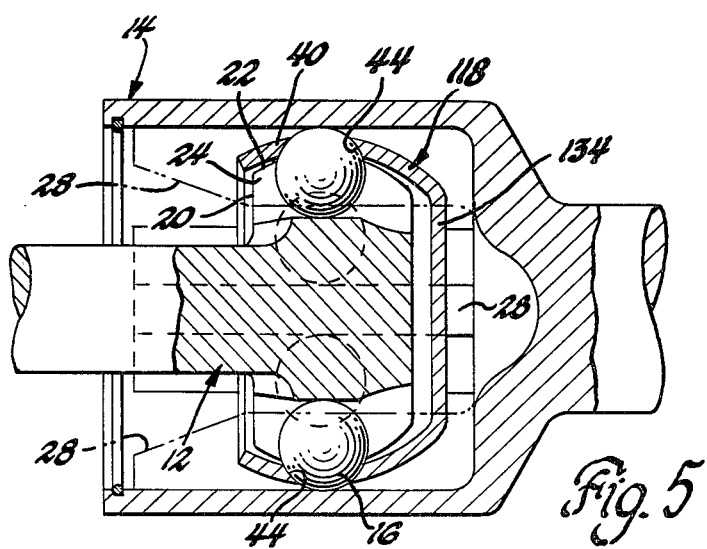

Other objects and features of the invention will become apparent to those skilled in the art as the disclosure is made in the following detailed description of a preferred embodiment of the invention as illustrated in the accompanying sheets of drawing in which:

FIG. 1 is a longitudinal partially sectioned view of a constant velocity universal joint in accordance with this invention bent at an angle, FIG. 2 is a longitudinal partially sectioned view showing the universal joint of FIG. 1 in an aligned or unbent condition, FIG. 3 is a view taken along the line 3—3 of FIG. 2 looking in the direction of the arrows, FIG. 4 is a view taken along the line 4—4 of FIG. 3 looking in the direction of the arrows, FIG. 5 is a view similar to FIG. 2 showing a universal joint having an alternate cage construction.

Referring now to the drawing there is disclosed in FIGS. 1, 2, 3 and 4 a universal joint 10 comprising an inner drive member 12, an outer drive member 14, a plurality of drive balls 16 and a cage 18. The inner drive member 12 has three radial extensions 20. Each of the radial extensions 20 has a part spherical outer surface 22 and an axial groove 24 in each radial face. The axial grooves 24 are substantially part circular in transverse section and generated from centerlines 24c parallel to the axis of the inner drive member 12. The curvatures of the axial grooves 24 extend radially outwardly of their respective centerlines so that the grooves 24 wrap around and locate the drive balls 16 radially with respect to the inner drive member 12.

The outer drive member 14 has three radial extensions 28 which extend inwardly from its bore 26. The radial faces of the extensions 28 have axial grooves 30 which are also substantially part circular in transverse section and generated from centerlines 30c parallel to the axis of the outer drive member 14. The curvatures of the axial grooves 30 extend radially inwardly of their respective centerlines so that the grooves 30 wrap around and locate the drive balls 16 radially with respect to the outer drive member 14. The radial extensions 28 of the outer drive member 14 are interdigitated with the radial extensions 20 of the inner drive member 12 so that their respective axial grooves 24 and 30 are arranged in circumferentially or tangentially confronting pairs engaging opposite sides of the drive balls 16.

When axes of the drive members 12 and 14 are aligned as shown in FIG. 2, the centerlines 24c and 30c of the confronting pairs of axial grooves 24 and 30 coincide. The curvatures of the axial grooves 24 and 30 substantially conform to the curvature of the drive balls 16. Consequently each of the drive balls 16 is located with its center at the coincident centerlines 24c and 30c of its associated pair of axial grooves 24 and 30. In the aligned condition, however, the cage 18 can tilt and consequently the universal joint 10 can only be used in an application where it always operates at an angle of at least a few degrees.

When the universal joint 10 is angulated or bent as shown in FIG. 1, the respective centerlines 24c and 30c of each of the confronting pairs of axial grooves 24 and 30 intersect in the homokinetic plane and the centers of the drive balls 16 are located at the centerline intersections either by the grooves themselves or the cage 18. The two drive balls 16 positioned in the plane of the joint angle, that is, the plane of the paper in FIG. 1, are in a ball entrapped condition and precisely located by their associated groove pairs. These two drive balls are located at a maximum distance from the hinge axis 32 which is perpendicular to the plane of the joint angle and passes through the joint center C at the intersection of the axes of the drive members 12 and 14. The two balls thus maximize the forces acting on the cage to position it in the homokinetic plane and resist the tendency of any of the other drive balls 16 to move out of the homokinetic plane. As mentioned previously the drive balls 16 positioned at the hinge axis are not ball entrapped and consequently must be located in the homokinetic plane by the cage. In reference to FIG. 3, it can readily be seen that when the inner drive member 12 is tilted about the hinge axis 32, the four pairs of grooves nearest the hinge axis 32 form funnels tending to squirt the two upper balls and the two lower balls in opposite directions. This of course is resisted by the cage 18 which is precisely located by the groove entrapped uppermost and lowermost drive balls 16.

The cage 18 comprises an end wall 34 having three radial arms and a central conical depression 36 which at its inner end forms a socket receiving a pivot pin 38 carried by the inner drive member 12. The cage 18 further comprises three circumferentially spaced, part spherical fingers 40 extending axially from the outer ends of the three radial arms of the end wall 34. Each of these fingers 40 has at each circumferential end an inward chordal flange 42 and a slot 44 which also extends through the flange 42 in the chordal direction.

The three part spherical fingers 40 are disposed between the part spherical outer surfaces 22 of the radial extensions 20 and the bore 26 in the radial direction and between the radial extensions 28 of the outer member 14 in the circumferential direction. The two slots 44 in each finger receive the two drive balls 16 engaging the two axial grooves 24 of the extension 20 associated with it. The faces of the chordal flanges 42 partly defining the slots 44 are flat and parallel and engage diametrically opposed portions of the drive balls 16 to maintain the centers of the drive balls coplanar. The cage 18 is centered in the radial direction by the outer curved portions of the slots 44 engaging the drive balls 16. The cage 18 maintains the drive balls 16 coplanar while intersecting pairs of axial grooves locate the entire caged complement of drive balls 16 in the homokinetic plane. Consequently the cage 18 need not be accurately pivoted on either of the drive membes 12 or 14. The cage 18 could however be centered in the radial direction by the part spherical fingers 40 piloting on the bore 26 of the outer drive member 14, or on the part spherical outer surfaces of the inner drive member 12 as an alternative to ball centering.

The pivot connection comprising the central conical depression 36 and pivot pin 38 in the embodiment shown in FIGS. 1-3 is merely to limit the axial movement of the cage 18 with respect to the inner drive member 12 so that the drive balls 16 do not exit the axial grooves 24. It is in fact preferable to permit axial movement between the cage 18 and the inner drive member 16 (which in the case of the embodiment shown in FIGS. 1-3 is possible because of the spacing between the surfaces 22 and the fingers 40) in order that the drive balls 16 initially roll rather than skid when the universal joint strokes or telescopes.

The embodiment shown in FIG. 4 has an alternate cage 118 for facilitating stroking but is otherwise the same as the universal joint shown in FIGS. 1-3. The cage 118 is not pivoted to the inner drive member 12 having instead a flat end wall 134. The cage 118 is otherwise the same as that shown in FIGS. 1-3 and like the cage 18 is centered in the radial direction by the curved portions of the cage slots engaging the drive balls 16 which is perhaps more clearly illustrated in FIG. 4. The cage 118 may move axially with respect to the inner drive member 12 within the limits of the spacing between the outer part spherical surfaces 22 of the inner drive member 12 and the inner part spherical surfaces of the cage fingers 40.

I wish it to be understood that I do not desire to be limited to the exact details of construction shown and described, for obvious modifications will occur to a person skilled in the art.

What is claimed is:

1. A universal joint comprising:
   an inner drive member having a plurality of radial extensions each having an axial groove of part circular section generated from a centerline parallel to the axis of the inner drive member and having a curvature which extends radially outwardly of the aforementioned centerline so as to locate a drive ball received therein radially with respect to the inner drive member,
   an outer drive member having a plurality of radial extensions each having an axial groove of part circular section generated from a centerline parallel to the axis of the outer drive member and having a curvature which extends radially inwardly of the last mentioned centerline so as to locate a drive ball received therein radially with respect to the outer drive member,
   each of the axial grooves of the inner drive member confronting an axial groove of the outer drive member in the circumferential direction,
   a drive ball disposed in each confronting pair of axial grooves with its center located at the intersection of the centerlines of its associated confronting pair of axial grooves when the axis of the outer drive member is at an angle to the axis of the inner drive member, and
   a cage engaging each drive ball and maintaining its center coplanar with the center of the other drive balls,
   said cage having a plurality of circumferentially spaced axial fingers disposed outwardly of the radial extensions of the inner drive member in the radial direction and between the radial extensions of the outer drive member in the circumferential direction.

2. The universal joint as defined in claim 1 wherein the radial extensions of each drive member are equally circumferentially spaced, are at least three in number and correspond in number to each other.

3. The universal joint as defined in claim 2 wherein each radial extension has an axial groove in each radial face and wherein each finger of the cage has a slot in each circumferential end whereby each finger maintains the centers of a pair of drive balls coplanar with the centers of the other drive balls.

4. A universal joint comprising:
an inner drive member having at least three circumferentially spaced radial extensions each having in each radial face an axial groove of part circular section generated from a centerline parallel to the axis of the inner drive member and having a curvature which extends radially outwardly of the aforementioned centerline so as to locate a drive ball received therein radially with respect to the inner drive member,
an outer drive member having a plurality of circumferentially spaced radial extensions corresponding in number to the radial extensions of the inner member, each of the radial extensions of the outer member having in each radial face an axial groove of part circular section generated from a centerline parallel to the axis of the outer drive member and having a curvature which extends radially inwardly of the last mentioned centerline so as to locate a drive ball received therein radially with respect to the outer drive member,
each of the axial grooves of the inner drive member confronting one of the axial grooves of the outer drive member,
a drive ball disposed in each confronting pair of axial grooves with its center located at the intersection of the centerlines of its associated confronting pair of axial grooves when the axis of the outer drive member is at an angle to the axis of the inner drive member, and
a cage for maintaining the centers of the drive balls coplanar comprising a plurality of circumferentially spaced fingers disposed outwardly of the radial extensions of the inner drive member in the radial direction and between the radial extensions of the outer drive member in the circumferential direction.

5. The universal joint as defined in claim 4 wherein each finger of the cage has a slot in each circumferential end whereby each finger maintains the centers of a pair of drive balls coplanar with the centers of the other drive balls.

6. The universal joint as defined in claim 4 wherein each finger of the cage is part spherical and has at each circumferential end a chordal flange and a slot which also extends through the chordal flange in the chordal direction and engages diametrically opposed portions of a drive ball to maintain its center coplanar with the centers of the other drive balls.

* * * * *

UNITED STATES PATENT AND TRADEMARK OFFICE
CERTIFICATE OF CORRECTION

PATENT NO. : 4,149,392
DATED : April 17, 1979
INVENTOR(S) : Dan R. Kimberlin

It is certified that error appears in the above—identified patent and that said Letters Patent are hereby corrected as shown below:

Column 3, line 65, "membes" should read -- members --.

Column 4, line 5, "FIGS. 1-3" should read -- FIGS. 1-4 --, line 11, "FIGS. 1-3" should read -- FIGS. 1-4 --, line 15, "FIG. 4" should read -- FIG. 5 --, line 17, "FIGS. 1-3" should read -- FIGS. 1-4 --, line 20, "FIGS. 1-3" should read -- FIGS. 1-4 --, line 23, "FIG. 4" should read -- FIG. 5 --.

Signed and Sealed this

Eleventh Day of September 1979

[SEAL]

Attest:

LUTRELLE F. PARKER

*Attesting Officer*    *Acting Commissioner of Patents and Trademarks*